United States Patent [19]
Nomura

[11] Patent Number: 5,467,227
[45] Date of Patent: Nov. 14, 1995

[54] ZOOM LENS BARREL

[75] Inventor: Hiroshi Nomura, Tokyo, Japan

[73] Assignee: Asahi Kogaku Kogyo Kabushiki Kaisha, Tokyo, Japan

[21] Appl. No.: 179,671

[22] Filed: Jan. 11, 1994

[30] Foreign Application Priority Data

Jan. 13, 1993 [JP] Japan ................... 5-004257

[51] Int. Cl.⁶ .................... G03B 1/18; G02B 15/14
[52] U.S. Cl. ................ 359/694; 359/699; 359/707; 359/700; 359/701
[58] Field of Search ................ 359/694, 695, 359/699, 700, 701, 704; 354/192.1, 192.12

[56] References Cited

U.S. PATENT DOCUMENTS

| | | | |
|---|---|---|---|
| 4,227,791 | 10/1980 | Komoto | 354/196 |
| 4,564,264 | 1/1986 | Komoto | 350/255 |
| 4,911,542 | 3/1990 | Nishio et al. | 350/429 |
| 5,043,752 | 8/1991 | Kohmoto | 354/195.12 |
| 5,144,493 | 9/1992 | Nomura | 359/700 |
| 5,221,993 | 6/1993 | Nomura | 359/601 |
| 5,231,449 | 7/1993 | Nomura | 354/485 |
| 5,245,476 | 9/1993 | Shono | 359/699 |
| 5,262,898 | 11/1993 | Nomura | 359/700 |

*Primary Examiner*—Georgia Y. Epps
*Assistant Examiner*—Ricky Mack
*Attorney, Agent, or Firm*—Sandler, Greenblum & Bernstein

[57] ABSTRACT

A zoom lens barrel is provided which comprises a pair of cylindrical members, which are interconnected by respective helicoids, and a discontinuous linear guide groove which is formed by cutting away outer pheripheral portions of the helicoid thereby forming a plurality of key grooves, wherein the guide groove is extended in a direction parallel with an optical axis of the zoom lens barrel.

18 Claims, 5 Drawing Sheets

ZOOM LENS BARREL

BACKGROUND OF THE INVENTION

1. Field of the Invention

The present invention relates to a zoom lens barrel which is used, for example, in a lens shutter type camera.

2. Description of Related Art

In a known camera having a zoom lens in which a lens barrel is moved in an optical axis direction by a helicoid mechanism, a cylindrical member of a lens advancing mechanism, which is provided on a peripheral surface thereof with a helicoid, is provided with a key way formed on the peripheral surface on which the helicoid is formed to move the lens barrel.

In a conventional lens shutter type camera having a zoom lens which is provided with a cam ring that is connected to an inner peripheral surface of a stationary ring (i.e., cylindrical member) secured to a camera body through male and female helicoids (i.e., helicoid mechanism) when the cam ring is rotated and, the zooming operation is carried out, the stationary ring is provided with a linear movement guide groove (i.e., key way) which extends in the optical axis direction thereof. Movable lens assemblies are received in the cam ring to move in the optical axis direction in accordance with the rotation of the cam ring. A linearly movable guide plate which is provided with an engaging projection that is fitted in the linear movement guide groove of the cam ring ensures the linear movement of the movable lens assemblies in the optical axis direction while preventing the rotation thereof.

In the above-mentioned known arrangement in which the linear movement guide groove is formed on the stationary ring and extends in the optical axis direction, it is necessary to provide a light intercepting member which closes a gap between the stationary ring and the cam ring in front of the linear movement guide groove to thereby prevent light from reaching a film surface through the linear movement guide groove.

The light intercepting member is continuously brought into forcible contact with the outer peripheral surface of the movable cam ring. Consequently, a frictional force is produced in the lens advancing mechanism which resists movement of the lens assemblies. This increases the power consumption of the battery.

The primary object of the present invention is to provide a zoom lens barrel in which light interception is ensured without the need to provide a special light intercepting member. In other words, the present invention is directed to preventing extraneous light from entering the camera through the key way formed on the cylindrical member.

To achieve the object mentioned above, in a zoom lens barrel having a cylindrical member which is provided on the periphery thereof with a helicoid and a key way extending in the optical axis direction, according to the present invention, the key way is formed by partially cutting away a portion of a helicoid.

According to an aspect of the present invention, a zoom lens barrel is provided which comprises a pair of cylindrical members which are interconnected by respective helicoids and, a discontinuous linear guide groove which is formed by cutting away outer peripheral portions of the helicoid, thereby forming a plurality of key grooves, wherein the guide groove is extended in a direction parallel with an optical axis of the zoom lens barrel.

According to another aspect of the present invention, a zoom lens barrel is provided with a cylindrical member having a helicoid on the periphery thereof, and a key way which extends in an optical axis direction of the lens barrel, wherein the key way is formed on the helicoid.

According to yet another aspect of the present invention, a zoom lens barrel is provided which comprises a pair of cylindrical members which are engaged with respective helicoids, and are rotatable with respect to one another. One of the helicoids is a discontinuous helicoid having a plurality of key grooves which are aligned in the optical axis direction of the lens barrel. A discontinuous linear guide groove is formed by the plurality of key grooves. The guide groove is extended in a direction parallel to an optical axis of the zoom lens barrel. In the case that the female helicoid is formed as the discontinuous helicoid, it is preferable that the distance between the optical axis of the zoom lens and the bottoms of the key grooves is less than a radius of a dedendum circle of the female helicoid. In the case that the male helicoid is formed as the discontinuous helicoid, it is preferable that the distance between the optical axis of the zoom lens and the bottoms of the key grooves is greater than a radius of a dedendum circle of the male helicoid.

The present disclosure relates to subject matter contained in Japanese patent application No. 5-4257 (filed on 93/1/13) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
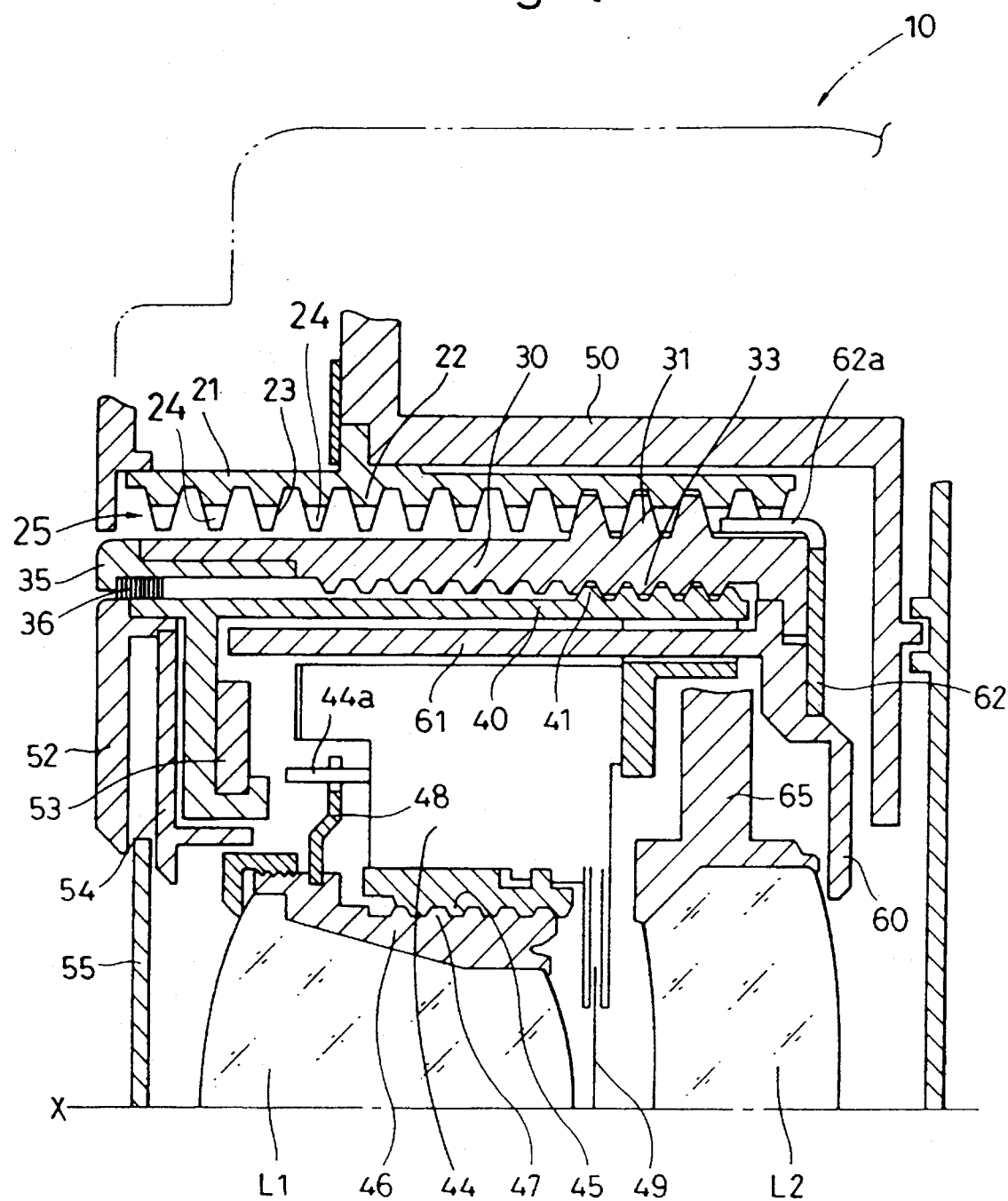
FIG. 1 is a longitudinal sectional view of an upper half of a zoom lens barrel, according to the present invention.

As shown in FIG. 1, a zoom lens barrel 1, according to the present invention, includes first (i.e., front) and second (i.e., rear) movable lens assemblies L1 and L2 which are moved in a relative manner along a predetermined locus to effect a zooming operation. The focusing is effected by the movement of the first lens assembly L1. For clarity, no driving mechanism of the second lens assembly L2 is shown in the drawings.

A stationary ring 21 is secured to a stationary block 50 which is in turn secured to a camera body 10. The stationary ring 21 is provided with a female helicoid 22 which is in mesh with a male helicoid 31 formed on the outer peripheral surface of a cam ring 30.

The stationary ring 21 is also provided with a linear movement guide groove 25 which intersects the threads 23 of the female helicoid 22 in a direction parallel with the optical axis X. According to one of the most significant features of the present invention, the linear movement guide groove 25 is defined by axially extending grooves (i.e., a plurality of key grooves) 24 that are formed by removing or cutting away the top ends of the threads 23 of the female helicoid 22. In the illustrated embodiment, the grooves 24 define a straight groove (i.e., linear movement guide groove 25) which extends in a direction parallel with the optical axis X. Namely, the first side surfaces 24b of the grooves 24 (i.e., one of a pair of opposite side surfaces of each groove 24) lie in an imaginary plane parallel with the optical axis X. The second side surfaces 24b' of the grooves 24 (i.e., the other side surface of each groove 24) lie in another imaginary plane parallel with the optical axis X. Consequently, a plane perpendicular to the imaginary planes is also perpendicular to the optical axis X.

Moreover, the radius of the bottoms 24a of the grooves 24 (i.e., the distance between the optical axis X and the bottom of the linear movement guide groove 25) is smaller than the radius of the tops 31a of the male helicoid 31 (i.e., the distance between the periphery of the male helicoid 31 and the optical axis X) which will be described hereinafter. The linear movement guide groove 25 slidably guides an engaging projection 62a of a linearly movable guide plate 62 in the optical axis direction X, as will become apparent hereinafter.

The cam ring 30 is provided in the stationary ring 21. The cam ring 30 is provided with the male helicoid 31 on the outer peripheral surface of the rear end thereof. The male helicoid 31 engages the female helicoid 22 of the stationary ring 21. Accordingly, the cam ring 30 is firmly held in the stationary ring 21 through the helicoid engagement. The male helicoid 31 spirals around the outer peripheral surface of the cam ring 30 through a plurality of turns. A flocked fabric ring 35, which is provided on the inner periphery thereof with a flocked fabric or felt 36, is secured to the front end of the cam ring 30. The flocked fabric 36 comes into contact with an outer peripheral surface of a front end of a movable lens barrel 40, which is provided in the cam ring 30, to prevent light from entering the zoom lens barrel through an annular gap between the cam ring 30 and the movable lens barrel 40.

The movable lens barrel 40 is provided on an outer peripheral surface of a rear end thereof with a male helicoid 41. The male helicoid 41 engages with the female helicoid 33 formed on the inner peripheral surface of the cam ring 30. The movable lens barrel 40 is guided by a linear movement guide plate 62 to move in the optical axis direction without rotating. The leads of the female helicoid 33 and male helicoid 41 are opposite to the leads of the female helicoid 22 and the male helicoid 31. Namely, when the rotation of the cam ring 30 takes place, the cam ring 30 is moved in the optical axis direction in accordance with the leads of the helicoids 31 and 21, and the movable lens barrel 40 is moved relative to the cam ring 30 in the same direction as the axial movement of the cam ring 30 in accordance with the leads of the helicoids 31 and 33.

The movable lens barrel 40 is also provided therein with an integral AF/AE unit 44 which is provided on an inner peripheral surface thereof with a female helicoid 45 that is in mesh with a male helicoid 47 formed on an outer peripheral surface of a first lens frame 46, to which the first lens assembly L1 is secured. The AF/AE unit 44 has a drive pin 44a, which is moved in the circumferential direction by an angular displacement corresponding to object distance data, and which is engaged by a drive arm 48 that projects from the first lens frame 46 in the radial direction. Consequently, the first lens frame 46, and accordingly, the first lens assembly L1, are moved by a displacement corresponding to the angular displacement of the drive pin 44a, in the optical axis direction in accordance with the leads of the helicoids 45 and 47, to carry out the focusing operation. Upon releasing, the AF/AE unit 44 opens and closes shutter blades 49 to perform the exposure in accordance with brightness data of an object to be photographed.

The movable lens barrel 40 has a cylindrical lens cover 52 secured to the front end thereof. In FIG. 1, 53 designates a barrier drive ring, 54 a barrier support, and 55 a barrier, respectively.

A linear movement guide ring 60 is fitted in the rear end of the cam ring 30 so as to move in the optical axis direction together with the cam ring and rotate relative to the cam ring. A linear movement guide rail 61 which extends in a direction parallel with the optical axis X is secured to the front face of the linear movement guide ring 60. The linear movement guide rail 61 is located between the inner surface of the movable lens barrel 40 and the AF/AE unit 44. The AF/AE unit 44 and the movable lens barrel 40 are guided by the linear movement guide rail 61.

The linear movement guide plate 62 is secured to the rear face of the linear movement guide ring 60. The linear movement guide plate 62 is provided with an engaging projection 62a that projects radially outward therefrom and is bent in the axial direction so as to be slidably fitted in the linear movement guide groove 25 of the stationary ring 21 behind the male helicoid 31 of the cam ring 30. Consequently, the linear movement guide plate 62 prevents the linear movement guide ring 60 from rotating with respect to the stationary ring 21. Thus, the movable lens barrel 40 is linearly movable in the axial direction, but is not rotatable with respect to the stationary ring 21.

A second lens frame 65 which holds the second lens assembly L2 has a guide pin (not shown) which is fitted in a predetermined profile of cam groove (not shown) formed in the cam ring 30, so that the rotation of the cam ring 30 causes the second lens frame 65 to move in the optical axis direction.

In the zoom lens barrel as constructed above, when the cam ring 30 is rotated, the cam ring 30 is moved in the optical axis direction X in accordance with the leads of the female helicoid 22 and the male helicoid 31 while being rotated. The axial movement of the cam ring 30 causes the movable lens barrel 40, which is rotatable relative to the cam ring 30 but not rotatable relative to the stationary ring 21, to move in the optical axis direction X. As a result, the first lens assembly L1 is moved together with the movable lens barrel 40 through the AF/AE unit 44, and the second lens assembly L2 is moved in the optical axis direction X while keeping a predetermined relationship to the first lens assembly L1, in accordance with the cam profile of the cam groove of the cam ring 30 in which the guide pin of the second lens frame 65 is fitted, so that the focal length can be varied.

Figure 2:
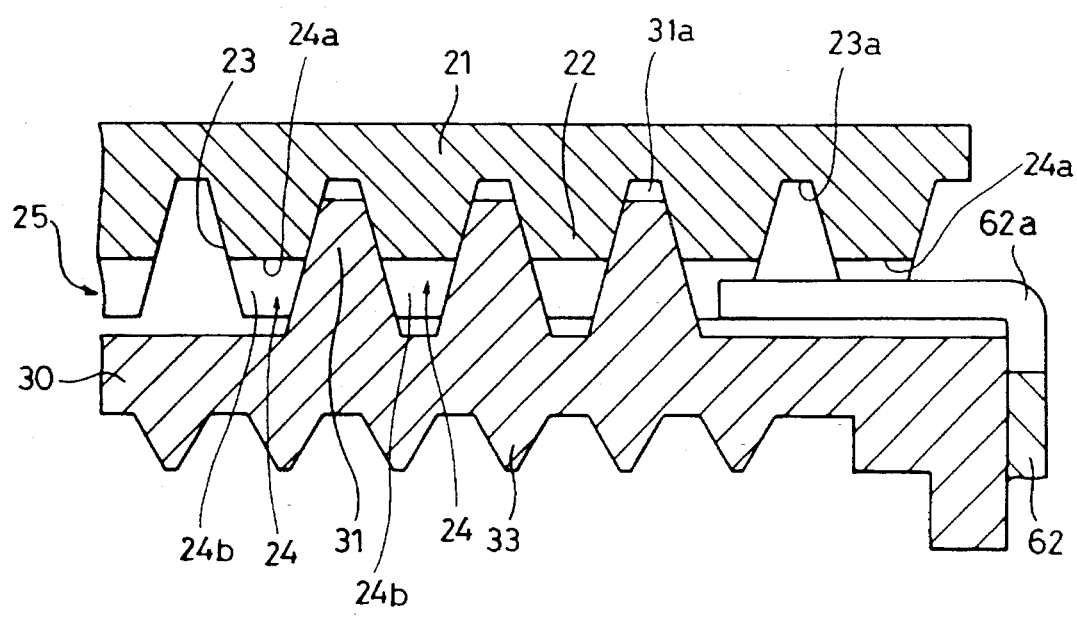
FIG. 2 is an enlarged sectional view of a main part of a zoom lens barrel shown in FIG. 1.
Figure 3:
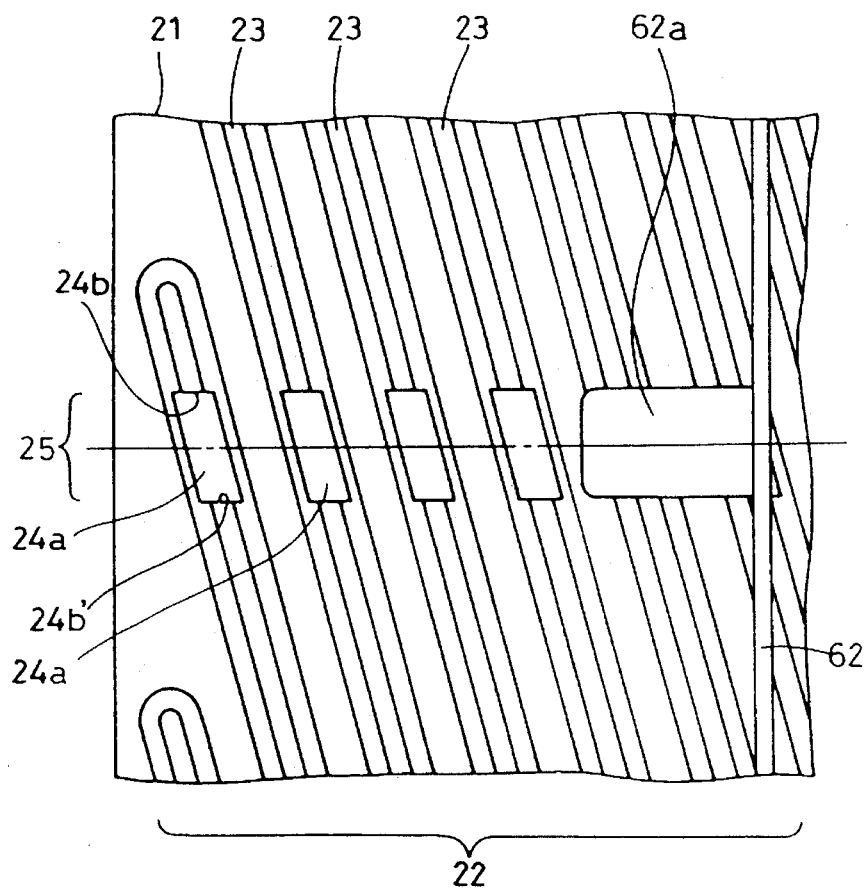
FIG. 3 is a developed view of an inner peripheral surface of a stationary ring of a zoom lens barrel shown in FIG. 1.
Figure 4:
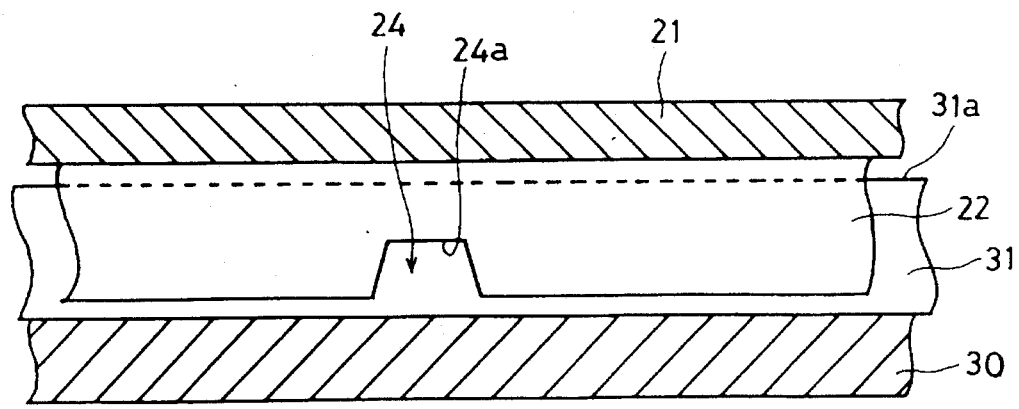
FIG. 4 is a front elevational view of a stationary ring and a cam ring in a zoom lens, viewed from the object side.

Interception of light by the linear movement guide groove 25 is ensured during the rotation of the cam ring 30. As can be seen in FIG. 2, owing to the presence of the teeth of the male helicoid 31 between the adjacent grooves 24 that define the linear movement guide groove 25, the optical path along the linear movement guide groove 25 is interrupted by the male helicoid 31. Namely, no extraneous light enters the zoom lens barrel through the linear movement guide groove 25 (FIG. 4). Consequently, reliable light interception is realized without providing an additional or special separate light intercepting member.

Figure 5:
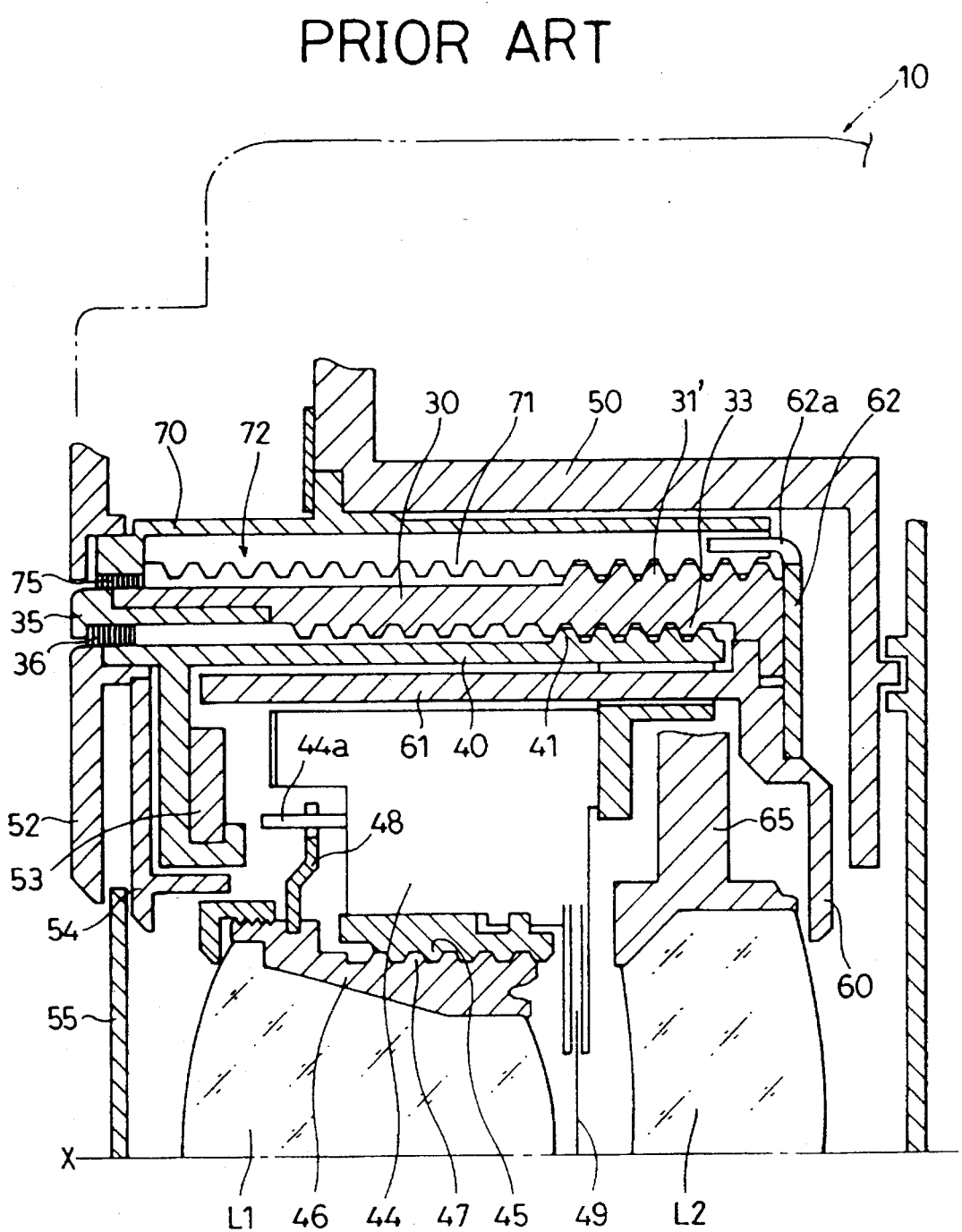
FIG. 5 is a longitudinal sectional view of an upper half of a known zoom lens barrel.
Figure 6:
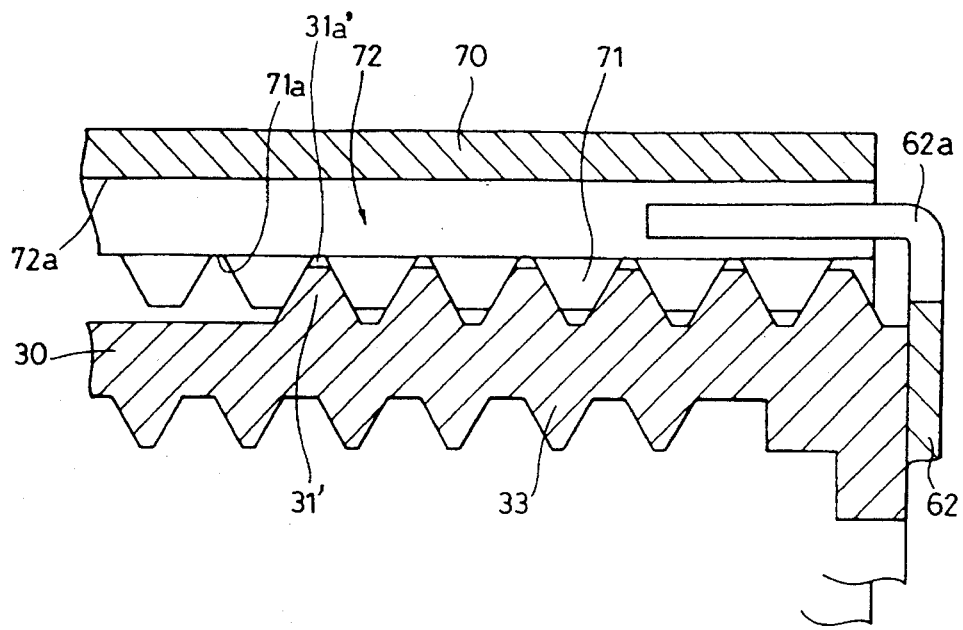
FIG. 6 is an enlarged sectional view of a linear movement guide groove and the surroundings thereof in the known zoom lens barrel shown in FIG. 5; and, FIG. 7 is a developed view of an inner peripheral surface of a stationary ring of a known zoom lens barrel shown in FIG. 5.
Figure 7:
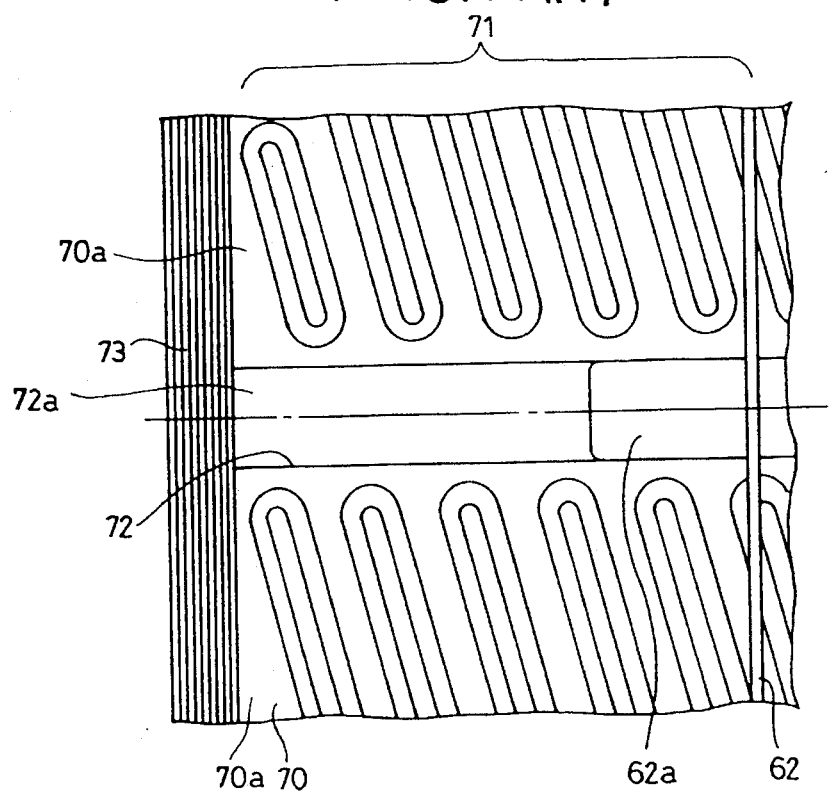

FIGS. 5 through 7 show a known zoom lens barrel for comparison with the zoom lens barrel according to the present invention. In FIGS. 5 through 7, the elements corresponding to those in FIGS. 1 through 4 are designated with like numerals.

The stationary ring 70 is provided, on the inner peripheral surface thereof, with a female helicoid 71 and a linear movement guide groove 72. The female helicoid 71 is engaged with the male helicoid 31' formed on the outer surface of the cam ring 30. The engaging projection 62a of the linear movement guide plate 62 is fitted in the linear movement guide groove 72.

The linear movement guide groove 72 is a continuous groove which extends through the stationary ring 70 in a direction parallel with the optical axis X. Furthermore, the linear movement guide groove 72 has a depth deeper than the bottom of the female helicoid 71. Consequently, there is a space between the tops 31a' of the threads of the male helicoid 31' and the bottom 72a of the linear movement guide groove 72. To prevent light from entering the zoom lens barrel through the gap or the linear movement guide groove, it was necessary in prior art to provide an additional flocked fabric 75 on the inner surface of the front end of the stationary ring 70. The flocked fabric 75 was contacted with the outer surface of the cam ring 30 to prevent light from reaching a film surface (not shown).

In the present invention, the linear movement guide groove 25 comprises separate grooves 24 which are discontinuously aligned along a line which is parallel with the optical axis. The grooves 24 are formed by cut-away portions of the top ends of the threads 23 of the female helicoid 22, so that the teeth (i.e., threads) of the male helicoid 31 are located between the adjacent grooves 24 (i.e., adjacent threads of the female helicoid 22), as mentioned above. Consequently, the linear movement guide groove 25 is interrupted by the threads of the male helicoid 31 that are located between the adjacent grooves 24 (FIG. 4). As a result, according to the present invention, light is intercepted by the threads of the male helicoid 31 and does not reach the film surface. Furthermore, according to the present invention, it is not necessary to provide an additional or special light intercepting member such as a flocked fabric 75 on the inner peripheral surface of the front end of the stationary ring 21 in order to realize a reliable light intercepting mechanism.

Although the linear movement guide groove 25 is provided at the female helicoid 22 on the inner peripheral surface of the stationary ring 21 in the illustrated embodiment, the present invention is not limited thereto. The present invention can be generally applied to a couple of cylindrical members which are interconnected through the respective helicoids, wherein the essential requirements to achieve the object of the present invention are, on one hand, to form a guide groove comprises discontinuous groove elements which are formed, for example, by removing or cutting away the top ends of the threads of one of the helicoids or by truncated threads; and on the other hand, to place the threads of the other helicoid between the adjacent removed or truncated top ends of the threads of the first helicoid.

Although the linear movement guide groove 25 comprises discontinuous groove elements 24 which are aligned along a straight line in the illustrated embodiment, the linear movement guide groove 25 is not necessarily a straight groove and can be of any shape. For instance, the linear movement guide groove 25 can be a curved or helical groove, provided that the side walls of the adjacent groove elements 24 lie on the same imaginary plane which could be a curved plane. Namely, an extension of one side wall of one groove element lies in the plane of the corresponding side wall of the adjacent groove element.

Although the cylindrical member is in the form of a stationary ring which is secured to the camera body in the illustrated embodiment, the present invention can be applied to any cylindrical member which rotates to guide a member supported therein in the optical axis direction thereof.

As can be understood from the above discussion, in a lens barrel having a cylindrical member which is provided on the periphery thereof with a helicoid and a guide groove which extends in the axial direction, according to the present invention, the guide groove is simply provided on and by the threads of the helicoid so that light incident upon the guide groove can be intercepted. Consequently, an additional light intercepting member is not necessary. The absence of such an additional light intercepting member as a separate element decreases the burden of the lens advancing mechanism, thus resulting in reduced battery power consumption in a zoom lens barrel. Also, the absence of the additional light intercepting member contributes to a realization of a small, light and inexpensive zoom lens barrel.

I claim:

1. A zoom lens barrel, comprising:

a pair of cylindrical members comprising first and second helicoid, respectively, said cylindrical members being mated by said respective helicoid; and, a discontinuous linear guide groove which is formed by cutting away top portions of teeth of one of said helicoid thereby forming a plurality of key grooves, wherein said guide groove is extended in a direction parallel with an optical axis of said zoom lens barrel, and wherein said first and second helicoid mate to block light from entering said linear guide groove.

2. The zoom lens barrel of claim 1, wherein said key grooves comprise side walls that lie on respective imaginary planes.

3. The zoom lens barrel of claim 1, further comprising:

an engaging projection that is fitted in said guide groove and which has a length longer than a distance between adjacent said key grooves.

4. The zoom lens barrel of claim 3, further comprising:

a movable member on which the engaging projection is supported, said movable member being movable relative to said cylindrical member comprising said helicoid in which said guide groove is formed.

5. The zoom lens barrel of claim 4, wherein one of said cylindrical members comprises an outer stationary ring secured to a camera body and the other of said cylindrical members comprises an inner cam ring.

6. The zoom lens barrel of claim 5, further comprising a movable lens frame to which said movable member is connected and which is movable in the optical axis direction together with said cam ring.

7. The zoom lens barrel of claim 6, wherein said cam ring is provided on an outer peripheral surface thereof with a male helicoid and said stationary ring is provided on an inner peripheral surface thereof with a female helicoid which is in mesh with said male helicoid.

8. The zoom lens barrel of claim 7, wherein said guide groove is formed by cutting away upper portions of said female helicoid.

9. The zoom lens of claim 8, wherein a radius of a circle defined by the bottoms of said key grooves is shorter than a radius of a circle defined by an outer periphery of said male helicoid.

10. The zoom lens barrel of claim 9, wherein said engaging projection is located behind the male helicoid.

11. The zoom lens barrel of claim 10, wherein said movable member comprises a linearly movable guide ring which holds movable lens assemblies.

12. The zoom lens barrel of claim 11, wherein said movable lens assembly comprises a zoom lens.

13. A zoom lens barrel comprising:
- a cylindrical member which is provided on a periphery thereof with a first helicoid and a key way which extends in an optical axis direction of the lens barrel, wherein said key way is formed on said helicoid; and
- a second helicoid which mates with said first helicoid and blocks light from entering said key way.

14. The zoom lens barrel of claim 13, wherein said cylindrical member comprises a stationary ring which is attached to a camera body of a lens shutter type camera.

15. The zoom lens barrel of claim 14, wherein said first helicoid comprises a female helicoid formed on an inner peripheral surface of said stationary ring and said second helicoid comprises a male helicoid formed on an outer peripheral surface of a cam ring that restricts movement of movable lens assemblies provided in the zoom lens barrel.

16. A zoom lens barrel, comprising:
- a pair of cylindrical members which are engaged with respective helicoid and are rotatable with respect to one another;
- one of said helicoid being a discontinuous helicoid having a key way formed on said discontinuous helicoid which are aligned in a direction parallel with an optical axis of said lens barrel;
- wherein a discontinuous linear guide groove is formed by a plurality of key grooves, wherein said guide groove is extended in a direction parallel to said optical axis of said zoom lens, and wherein the other of said helicoid mates with said one of said helicoid to block light from entering said discontinuous linear guide groove.

17. The zoom lens barrel of claim 16, wherein said one of said helicoid is a male helicoid, and wherein a distance between said optical axis and the bottoms of said key grooves is greater than a radius of a dedendum circle of said one of said helicoid.

18. The zoom lens barrel of claim 16, wherein said one of said helicoid comprises a female helicoid, and a distance between said optical axis and bottoms of said key grooves is less than a radius of a dedendum circle of said one of said helicoid.

* * * * *